United States Patent [19]
Chang et al.

[11] Patent Number: 5,161,119
[45] Date of Patent: Nov. 3, 1992

[54] WEIGHTED-DELAY COLUMN ADDER AND METHOD OF ORGANIZING SAME

[75] Inventors: Yen C. Chang, Saratoga; Jeffrey A. Werner, Santa Clara, both of Calif.

[73] Assignee: LSI Logic Corporation, Milpitas, Calif.

[21] Appl. No.: 479,933

[22] Filed: Feb. 14, 1990

[51] Int. Cl.[5] ............................................. G06F 7/50
[52] U.S. Cl. ................................................... 364/786
[58] Field of Search ................................ 364/784, 786

[56] References Cited

U.S. PATENT DOCUMENTS

| | | | |
|---|---|---|---|
| 4,683,548 | 7/1987 | Mlynek | 364/786 |
| 4,887,233 | 12/1989 | Cash et al. | 364/757 |
| 4,939,687 | 7/1990 | Hartley et al. | 364/757 |
| 5,010,511 | 4/1991 | Hartley et al. | 364/786 |
| 5,036,483 | 7/1991 | Virtue | 364/786 |
| 5,065,353 | 11/1991 | Nojiri et al. | 364/786 |

OTHER PUBLICATIONS

1.5-Micron Compacted Array® Technology, LSI Logic Corporation, Databook, Jul. 1987, pp. 2-78, 79, 80, 81, 120.
LCBI5 Cell-Based ASIC, LSI Logic Corporation, Databook, Mar. 1988, pp. 2-20, 21.

Primary Examiner—Tan V. Mai
Attorney, Agent, or Firm—Michael D. Rostoker; Gerald E. Linden

[57] ABSTRACT

An adder array for adding two or more input addends, whose bit lengths are not necessarily matched, and a method of configuring the adder array are disclosed. The addends are organized according to bit weight, and bits of equal weight are added in adder columns. Carry-outs are introduced into subsequent, higher weight adder columns according to delay. Thereby, the delay associated with the addition of the addends is minimized. Method and apparatus is disclosed.

13 Claims, 9 Drawing Sheets

$C = A \times B$

WHERE

A IS AN 8-BIT BINARY MULTIPLICAND
B IS A 1-BIT BINARY MULTIPLIER
C IS AN 8-BIT BINARY PRODUCT

WEIGHTED-DELAY COLUMN ADDER AND METHOD OF ORGANIZING SAME

TECHNICAL FIELD OF THE INVENTION

The present invention relates to digital adders, such as may be employed in the sum-of-products portion of multipliers, multiplier-adders, such as may be embodied in a "Wallace Tree" structure, and in "n" addend adders.

BACKGROUND OF THE INVENTION

The simplest form of multiplier is the "AND" gate. The output of such a gate may be viewed as the one-bit product of two one-bit inputs. However, the utility of using a single AND gate for multiplying is limited to multiplicands of only one binary bit, producing a one bit product. Binary numbers (multiplicands) of any bit length may be multiplied by a one-bit binary number (multiplier) by using a number of "AND" gates equal to the number of bits in the multiplicand. Assuming a one-bit multiplier and an 'n'-bit multiplicand, one input of each of the 'n' gates is assigned to one bit of the multiplicand while the other input of all of the gates is connected to the multiplier. If the outputs of this array of "AND" gates is taken as an 'n'-bit binary number, it represents the product of the two numbers. A simple 1-bit by 8-bit instance of this type of multiplier is shown in FIG. 1.

If two binary numbers, each having a length of 'n' bits, are to be multiplied together, the aforementioned scheme may be replicated for each bit of the multiplier. Each of the resulting bits represents a partial product. These partial products must be summed to arrive at the resulting fully resolved product of the multiplier and multiplicand. In the process of summings, it must be recognized that each one-bit partial product has a binary weight (i.e., significance) associated with it, i.e., the bit value will be one or zero, but it represents a binary value which is determined by the product of the binary weights of the two bits whose product it represents.

The complexities encountered in the design of parallel adders suitable for the sum-of-products application in parallel multipliers led to the development of the "Wallace Tree". Simply stated, the Wallace Tree is a logical connection of full adders which can simply be replicated (in an array) to perform the sum of products calculation. An example of a Wallace Tree is the Texas Instrument type SN54LS275 4-bit-by-4-bit binary multiplier with 3-state outputs, 7-bit slice Wallace Tree with 3-state outputs.

As is well known, the full adder is a logical device that has three one-bit inputs, a one-bit sum output and a one-bit carry out. It is also well established that the full adder interposes a delay, hereinafter referred to as a one "unit" (of time) delay, between its inputs and outputs. Hence, in any interconnection of full adders, such as in a typical Wallace Tree, the various columns being added experience different delays due to their different logic path lengths. For instance, in a typical Wallace Tree, such as the aformentioned SN54LS275, the least significant digit (column) passes straight through, experiencing a delay of only one unit, while intermediate significant digits experience a greater delay of three units. Evidently, as the Wallace Tree is replicated, forming an array to handle larger and larger multiplicands and multipliers, greater and greater delays are interposed, resulting in slower response times for larger arrays. The effective system delay for any such adder, regardless of configuration, is the delay incurred in the longest path from input to output, since the result may not be considered valid until its last component bit has settled to a stable state.

A significant contributor to the delay in current parallel adder configurations is the "carry" logic. Typically, all of the bits of a given weight are summed to arrive at intermediate multi-bit sums. For example, if seven input bits are to be summed, an array of adders is typically configured which will produce a 3 bit binary result whose value may range between 0 and 7 (000 and 111 binary). The least significant bit of this sum has the same binary weight as the component (input) bits, but the other output bits are carried over to neighboring (more significant) columns according to their binary weight, where they must be summed with other component bits having the same weight. The bit having the same weight as its component bits may yet have to be added to other component bits at the same weight or combined with other partial multi-bit sums. This may, in turn, produce further multi-bit sums which must further be added to other component bits. As a result of this process of adding intermediate sums together to arrive at other intermediate sums, the longest path in the circuit can become quite long. Further, the carry bits between columns are typically inserted in the adder chain at a point which is logically convenient, but which may not necessarily be the most efficient in terms of delay.

While the Wallace Tree offers a straightforward, systematic, standardized approach to multiplication, and multiplier design, it is very gate intensive and it is usually not optimized for performance.

Non-standardized (hand) design of multipliers, adders and multiplier-adders is very time consuming and error prone. Various compilers which have been employed for this task are limited in their flexibility and optimization approaches.

DISCLOSURE OF THE INVENTION

It is therefore an object of the invention to provide a technique for improving the performance of the "Wallace Tree" section of multipliers, multiplier-adders and "n" addend adders.

It is a further object of the invention to provide an adder capable of dealing with dissimilar column heights, wherein each multiplicand or multiplier doesn't have to have the same bit width or weight.

It is a further object of the invention to provide a standardized method of designing multiplier-adders.

It is a further object of the invention to provide a method of designing different sizes and features of multipliers, adders, etc.

It is a further object of the invention to provide an adder allowing for unlimited height on any given column.

It is a further object of the invention to provide an adder that can add numbers with different bit width and weight(s).

It is a further object of the invention to provide an adder that approaches having a minimum delay associated with the final result.

It is a further object of the invention to provide an adder that has a highly gate-efficient design.

It is a further object of the invention to provide a fast, gate-efficient "Wallace Tree" with "n" partial products generated from one or more multiplicand and multiplier pairs.

According to the invention, the Weighted-Delay Column Adder adds (sums) input bits on a column-by-column basis, starting from the column having the input bits with the least binary-weight (significance). Based on the number of input bits in any particular column, an adder chain (column array) is configured for each column to terminate the carry-outs as soon as possible so that at most two one-bit column results can be added by a fast (parallel) adder to obtain a final result. Propagation delays (D) of intermediate sums and carry-outs throughout the adder chains are accounted for.

With the weighted-delay column adder of the present invention, the height of the various columns (i.e. the number of inputs in any particular column) may be dissimilar, and there is no limit to the height of a column. By allowing unlimited height on any given column, special "n" addend adders can be configured for use in indexing, or in adders that can add numbers with different bit width(s) or weight(s). In addition to its utility in association with multiplier-adders, or for obtaining the sum of (partial) products, such as may result from multiplications such as A*B+C*D +E*F+... with different bit width and weight(s), the techniques disclosed herein result in minimum delay in the final result of binary addition and highly gate-efficient designs.

The Weighted-Delay Column Adder is configured by analyzing columns of component (input) bits, such as may be result from the partial products of a multiplication, one column at a time, starting from the column containing input bits having the least weight or weights (least significant column of bits). Each of the input bits arriving at the Weighted-Delay Column Adder is considered to have a "zero delay", prior to its introduction to the Adder. In the case of multiplying binary numbers the input bits would be one-bit partial products of the multiplication.

One skilled in the art to which this invention most nearly pertains will recognize that the input bits (of the addends) may not arrive at the weighted-delay column adder at the same time, and their arrival times should be accounted for. Hence, the assumption of a "zero" delay for the input bits is intended to be for illustrative purposes only.

Carry-outs from column-to-column (adder chain to adder chain) are classified (weighted) according to delay, for instance by taking the number of adders in the longest path from the zero-delay inputs to the carry-out under consideration.

The Weighted-Delay Column Adder is designed to add "n" addends of varying widths as fast as possible by taking into account each column of bits and the delay of each bit as it propagates through the column, from top to bottom. Terminating the bits with the longest delay first, the least significant column is structured as a chain (vertical array) of adders, and its carry-outs are provided to the next significant bit column. The next significant bit column is similarly structured, and so on. By knowing the number of bits in a column, an adder chain can be constructed to producing a valid bit value for that column.

In the resulting, exemplary hardware configuration of the weighted-delay column adder, the construction of the first column (e.g. $2^0$) is very straightforward, since there are no carries into the $2^0$ column, and all of the input bits are considered to be zero-delay inputs.

For example, if the $2^0$ column contains seven component input bits, then a "chain" of three full-adders can be constructed to arrive at the correct end result for the $2^0$ column. Three of the $2^0$ weighted component bits will be placed at the inputs of the first adder, three at the second and one at the third. The intermediate sum outputs of the first and second adders will be connected to the remaining two inputs of the third adder. Each of the three adders will have a carry-out to the $2^1$ stage.

Since the final result (out of the third adder) can experience delays from up to two adders, (each adder is considered as imposing a one "unit" propagation delay), the final result will have a delay of two units. The carry-out bits from the first, second and third adders will have unit delays of one, one, and two units, respectively, and will be combined in the next more significant adder chain with input bits, intermediate sums and/or a partial result thereof having the most nearly matched propagation delays. In other words, carry-outs from the previous column are combined in the present column (adder chain) at points therein having the most nearly matched propagation delay associated therewith.

One skilled in the art to which this invention most nearly pertains will recognize that the actual delay imposed between the inputs and outputs of an adder is dependent upon logic states and conditions, as well as upon device configuration. Hence, the assumption of each adder imposing a one-unit delay is for illustrative purposes only.

In the following and subsequent (next higher) columns, carry-out bits from the previous column are introduced into the present column at a point where their delay is closely matched to the delay of the input bits, intermediate sums and/or column results occurring in the present column. Carry-outs are always terminated in the next more significant column, and carry-outs with the longest delays are terminated in the last (bottom most) segments of the column, and in some cases are terminated at the end of the more significant column, so that their delay has a minimal contribution to the overall column delay. Each column, or adder chain is constructed from full and/or half adders.

A significant difference between the technique of the present invention and previous approaches is that the end of the adder chain for each column produces either one or two one-bit column results. In the case of two column results, each result is termed a "partial" result. A final ripple-carry adder stage or other similar binary adder, such as a parallel adder, may be used to combine the closely delay-matched column results into a final result. Because carry-outs from each adder chain are terminated in the next more significant adder chain, delays are minimized and are not redundantly cascaded. In some cases, the carry-out from the previous column having the longest delay associated therewith is introduced at the end of the next adder chain and is treated as a partial result of the next column.

Other objects, features and advantages of the invention will become apparent in light of the following description thereof.

DETAILED DESCRIPTION OF THE INVENTION

Figure 1:
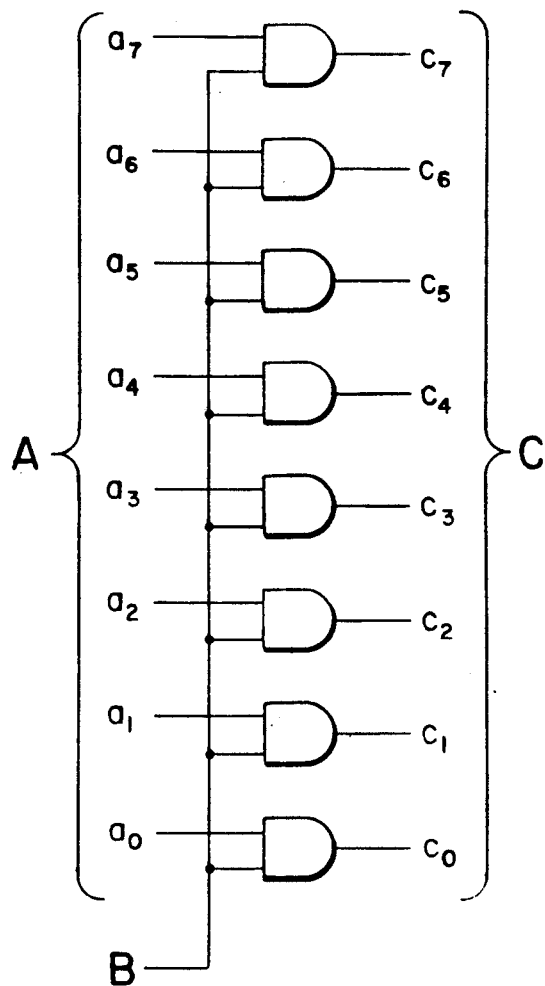
FIG. 1 is a diagram of a prior art 1-bit by 8-bit multiplier constructed of "AND" gates.

The present invention is particularly useful for adding partial products, such as may be generated by a Wallace Tree Array, but may also be used for the implementation of functions which would ordinarily require multiple Wallace Trees.

Consider the case of A times B, plus C times D, where A, B, C and D are each 4-bit binary numbers. A, B, C and D are readily expressed as follows:

$$A = a_3 2^3 + a_2 2^2 + a_1 2^1 + a_0 2^0$$

$$B = b_3 2^3 + b_2 2^2 + b_1 2^1 + b_0 2^0$$

$$C = c_3 2^3 + c_2 2^2 + c_1 2^1 + c_0 2^0$$

$$D = d_3 2^3 + d_2 2^2 + d_1 2^1 + d_0 2^0$$

The first partial product of A times B may be expanded as follows, arranged as binary bits $a_n$ and $b_n$ in columns of $2^n$:

| $2^6$ | $2^5$ | $2^4$ | $2^3$ | $2^2$ | $2^1$ | $2^0$ |
|---|---|---|---|---|---|---|
|  |  |  | $b_0a_3$ | $b_0a_2$ | $b_0a_1$ | $b_0a_0$ |
|  |  | $b_1a_3$ | $b_1a_2$ | $b_1a_1$ | $b_1a_0$ |  |
|  | $b_2a_3$ | $b_2a_2$ | $b_2a_1$ | $b_2a_0$ |  |  |
| $b_3a_3$ | $b_3a_2$ | $b_3a_1$ | $b_3a_0$ |  |  |  |

Similarly, the second partial product of C times D may be expanded as follows:

| $2^6$ | $2^5$ | $2^4$ | $2^3$ | $2^2$ | $2^1$ | $2^0$ |
|---|---|---|---|---|---|---|
|  |  |  | $d_0c_3$ | $d_0c_2$ | $d_0c_1$ | $d_0c_0$ |
|  |  | $d_1c_3$ | $d_1c_2$ | $d_1c_1$ | $d_1c_0$ |  |
|  | $d_2c_3$ | $d_2c_2$ | $d_2c_1$ | $d_2c_0$ |  |  |
| $d_3c_3$ | $d_3c_2$ | $d_3c_1$ | $d_3c_0$ |  |  |  |

Looking at the totality of the partial products A times B and C times D, column-by-column, results in:

| $2^6$ | $2^5$ | $2^4$ | $2^3$ | $2^2$ | $2^1$ | $2^0$ |
|---|---|---|---|---|---|---|
|  |  |  | $b_0a_3$ | $b_0a_2$ | $b_0a_1$ | $b_0a_0$ |
|  |  | $b_1a_3$ | $b_1a_2$ | $b_1a_1$ | $b_1a_0$ |  |
|  | $b_2a_3$ | $b_2a_2$ | $b_2a_1$ | $b_2a_0$ |  |  |
| $b_3a_3$ | $b_3a_2$ | $b_3a_1$ | $b_3a_0$ |  |  |  |
|  |  |  | $d_0c_3$ | $d_0c_2$ | $d_0c_1$ | $d_0c_0$ |
|  |  | $d_1c_3$ | $d_1c_2$ | $d_1c_1$ | $d_1c_0$ |  |
|  | $d_2c_3$ | $d_2c_2$ | $d_2c_1$ | $d_2c_0$ |  |  |
| $d_3c_3$ | $d_3c_2$ | $d_3c_1$ | $d_3c_0$ |  |  |  |

Evidently, the columns have different "heights". This is more graphically represented by "collapsing" the columns, as follows:

| $2^6$ | $2^5$ | $2^4$ | $2^3$ | $2^2$ | $2^1$ | $2^0$ |
|---|---|---|---|---|---|---|
|  |  |  | $b_0a_3$ |  |  |  |
|  |  |  | $b_1a_2$ |  |  |  |
|  |  | $b_1a_3$ | $b_2a_1$ | $b_0a_2$ |  |  |
|  |  | $b_2a_2$ | $b_3a_0$ | $b_1a_1$ |  |  |
|  | $b_2a_3$ | $b_3a_1$ | $d_0c_3$ | $b_2a_0$ | $b_0a_1$ |  |
|  | $b_3a_2$ | $d_1c_3$ | $d_1c_2$ | $d_0c_2$ | $b_1a_0$ |  |
| $b_3a_3$ | $d_2c_3$ | $d_2c_2$ | $d_2c_1$ | $d_1c_1$ | $d_0c_1$ | $b_0a_0$ |
| $d_3c_3$ | $d_3c_2$ | $d_3c_1$ | $d_3c_0$ | $d_2c_0$ | $d_1c_0$ | $d_0c_0$ |

Since each of the bits $a_n$, $b_n$, $c_n$ or $d_n$ is a single bit, each of the partial products $b_na_n$ and $d_nc_n$ is a single bit, and may be obtained with an "AND" gate, as discussed hereinbefore.

All of the partial products are assumed to arrive as input bits at the weighted-delay column adder at the same time, with "zero" delay as discussed hereinbefore, and the delay through each individual adder in the various adder chains is assumed to be one-unit (of time).

The columns ($2^n$) are each added with the weighted-delay technique of the present invention.

First, the columns of input bits are "decomposed", one-by-one, according to the delays of the bits in each of the columns. An adder chain is configured for each column to arrive at either a one- or two-component column result, where both components, if present, will have a binary weight which is equal to the weight (binary significance) of that column. If a column has a two-component result, one of the components will be the longest-delay carry-out from the previous column.

Initially, for example, all of the columns are assumed to be full of zero-delay input bits, as shown in the following where each input bit is represented by a "0":

| $2^6$ | $2^5$ | $2^4$ | $2^3$ | $2^2$ | $2^1$ | $2^0$ |
|---|---|---|---|---|---|---|
|  |  |  | 0 |  |  |  |
|  |  |  | 0 |  |  |  |
|  |  | 0 | 0 | 0 |  |  |
|  |  | 0 | 0 | 0 |  |  |
|  | 0 | 0 | 0 | 0 | 0 |  |
|  | 0 | 0 | 0 | 0 | 0 |  |
| 0 | 0 | 0 | 0 | 0 | 0 | 0 |
| 0 | 0 | 0 | 0 | 0 | 0 | 0 |

The $2^0$ column is processed first. Since there are only two input bits in this columns, they may be added with a half-adder. This would produce a one-unit delay column result (represented by the "1" beneath the $2^0$ column, below) and a one-unit delay carry-out (represented by the "1" at the top of the $2^1$ column, below) which is placed in the $2^1$ column, as follows:

| $2^6$ | $2^5$ | $2^4$ | $2^3$ | $2^2$ | $2^1$ | $2^0$ | |
|---|---|---|---|---|---|---|---|
| | | | | | 0 | | |
| | | | | | 0 | • | |
| | | | | 0 | 0 | 0 | |
| | | | | 0 | 0 | 1 | <=one-delay carry-out from $2^0$ column |
| | | 0 | 0 | 0 | 0 | 0 | |
| | | 0 | 0 | 0 | 0 | 0 | |
| 0 | 0 | 0 | 0 | 0 | 0 | | |
| 0 | 0 | 0 | 0 | 0 | 0 | | |
| | | | | | 1 | | <=one-delay column result |

Next, the $2^1$ column is processed. Three of the four zero-delay input bits (represented by "0", above) are added in a full adder, producing a one-delay intermediate sum (not shown) and a one-delay carry-out (shown below as "1") which is placed in the $2^2$ column.

The one-delay carry-out from the $2^0$ column, the remaining zero-delay input and the intermediate sum are then added in a second full adder to arrive a two-delay column result (shown as "2", below the $2^1$ column) and a two-delay carry-out (shown as "2", below in the $2^2$ column) which is placed in the $2^2$ column, as follows:

| $2^6$ | $2^5$ | $2^4$ | $2^3$ | $2^2$ | $2^1$ | $2^0$ | |
|---|---|---|---|---|---|---|---|
| | | | | 0 | 2 | | <=two-unit delay carry out from $2^1$ column |
| | | | | 0 | 1 | | <=one-unit delay carry out from $2^1$ column |
| | | | 0 | 0 | 0 | | |
| | | | 0 | 0 | 0 | | |
| | | 0 | 0 | 0 | 0 | | |
| | | 0 | 0 | 0 | 0 | | |
| 0 | 0 | 0 | 0 | 0 | | | |
| 0 | 0 | 0 | 0 | 0 | | | |
| | | | | | 2 | | <=two-unit delay column result for $2^1$ column |

Hence, it can already be seen that the carry-outs from a "previous" column are inserted for addition into the "next", or present column, and their delays are matched as nearly as possible with the delays of intermediate sums in the present column. For instance, in the $2^1$ column, the one-unit delay carry-out from the $2^0$ column is added (e.g. in a full adder) with the one-unit delay intermediate sum in the $2^1$ column, and with the zero-unit delay input ebit in the $2^1$ column which has a lesser delay.

Next, the $2^2$ column is processed. Two full-adders may be employed to add the six zero-delay input bits ("0", above), arriving at two one-delay intermediate sums (not shown) and two one-unit delay carry outs (each represented by "1", below) which are placed (as carry-ins) in the $2^3$ column. The one-delay carry-out from the $2^2$ column and the two one-delay intermediate sums may be added with a full adder, producing a two-delay column result (shown as "2", below) and a two-delay carry-out (shown as "2", below) which is placed in the $2^3$ column. The two-delay carry-out from the $2^1$ column is treated as a "partial" column result along with the result (also considered to be a "partial" column result) from the last adder in this chain. These two (partial) column results can be combined into a final result using a final stage ripple-carry adder (shown in FIG. 21, and described hereinafter).

| $2^6$ | $2^5$ | $2^4$ | $2^3$ | $2^2$ | $2^1$ | $2^0$ | |
|---|---|---|---|---|---|---|---|
| | | | | 2 | | | <=two-unit delay from previous column |
| | | | | 1 | | | <=one-unit delay from previous column |
| | | | | 1 | | | <=one-unit delay from previous column |

-continued

| $2^6$ | $2^5$ | $2^4$ | $2^3$ | $2^2$ | $2^1$ | $2^0$ | |
|---|---|---|---|---|---|---|---|
| | | | | 0 | | | |
| | | | | 0 | | | |
| | | | 0 | 0 | | | |
| | | | 0 | 0 | | | |
| | | 0 | 0 | 0 | | | |
| | | 0 | 0 | 0 | | | |
| 0 | 0 | 0 | 0 | | | | |
| 0 | 0 | 0 | 0 | | | | |
| | | | | 2 | | | <=two-delay result out of $2^2$ column |
| | | | 2 | | | | <=two-delay carry-out from $2^1$ column |

Again, it is evident that the carry-outs from the previous ($2^1$) column are combined in or at the end (bottom) of the present ($2^2$) column adder chain at points where their delays are closely matched to the delays of the intermediate sums or partial results thereof. In the example given above, the two-delay carry out from the $2^1$ column is treated as a partial column result of the $2^2$ column. It is further demonstrated that having two partial results at the end of the adder chain is acceptable, and these two partial results will be combined (added) as described hereinafter with respect to FIG. 21.

Next, the $2^3$ column is processed. Six of the eight zero-delay input bits ("0", above) are summed using full adders, producing two one-delay carry-outs (shown below) which are placed in the $2^4$ column, and two one-delay intermediate sums. The two remaining zero-delay input bits and one of the one-delay carry-outs from the previous $2^2$ column are summed, producing a two-delay intermediate sum (not shown) and a two-delay carry-out (shown below). The two one-delay intermediate sums and the remaining one-delay carry-out from the previous column are added in a full adder producing a two-delay partial column result (shown below) and a two-delay carry-out (shown below) which is placed in the $2^4$ column. The two-delay intermediate sum and the two-delay carry-out from the previous column are added in a half adder to produce a three-unit delay partial result (shown below) and a three-unit delay carry-out (shown below) which is placed in the next higher column.

| $2^6$ | $2^5$ | $2^4$ | $2^3$ | $2^2$ | $2^1$ | $2^0$ | |
|---|---|---|---|---|---|---|---|
| | | 3 | | | | | <=three-delay carry-out from $2^3$ column |
| | | 2 | | | | | <=two-delay carry-out from $2^3$ column |
| | | 2 | | | | | <=two-delay carry-out from $2^3$ column |
| | | 1 | | | | | <=one-delay carry-out from $2^3$ column |
| | | 1 | | | | | <=one-delay carry-out from $2^3$ column |
| | | 0 | | | | | |
| | | 0 | | | | | |
| | 0 | 0 | | | | | |
| | 0 | 0 | | | | | |
| 0 | 0 | 0 | | | | | |
| 0 | 0 | 0 | | | | | |
| | | | 3 | | | | <=three-delay partial result |

-continued

| $2^6$ | $2^5$ | $2^4$ | $2^3$ | $2^2$ | $2^1$ | $2^0$ | |
|---|---|---|---|---|---|---|---|
| | | | 2 | | | | <= two-delay partial result |

It will be seen that the three-unit delay carry-in to the $2^4$ column, shown above at the top of the column, will be treated as a partial result in the $2^4$ column, and summed with a second partial result of the adder chain of the $2^4$ column.

Next, the $2^4$ column is processed. The six zero-delay input bits (shown above) are added in a pair of full adders, producing two one-delay intermediate sums (not shown), and two one-delay carry-outs (shown below) which are placed in the $2^5$ column. The two intermediate sums and one of the one-delay carries from the $2^3$ column are added in a full adder producing a two-delay carry-out (shown below) which is placed in the $2^5$ column and a two-delay intermediate sums (not shown). The two-delay intermediate sum, the remaining one-delay carry-in from the $2^3$ column, and one of the two-delay carry-ins from the $2^3$ column are added in a full adder, producing a three-delay carry-out (shown below) which is placed in the $2^5$ column and a three delay intermediate sum. The remaining two-delay carry from the $2^3$ column and the three-delay intermediate sum are added together in a half adder, producing a four-delay partial result (shown below) and a four-delay carry-out (shown below) which is placed in the $2^5$ column. The three-delay carry-in from the $2^3$ column is taken together with the four-delay partial result as a pair, will be combined in a final ripple-carry adder (FIG. 2I).

| $2^6$ | $2^5$ | $2^4$ | $2^3$ | $2^2$ | $2^1$ | $2^0$ | |
|---|---|---|---|---|---|---|---|
| | 4 | | | | | | <= four-delay carry from $2^4$ column |
| | 3 | | | | | | <= three-delay carry from $2^4$ column |
| | 2 | | | | | | <= two-delay carry from $2^4$ column |
| | 1 | | | | | | <= one-delay carry from $2^4$ column |
| | 1 | | | | | | <= one-delay carry from $2^4$ column |
| | 0 | | | | | | |
| | 0 | | | | | | |
| 0 | 0 | | | | | | |
| 0 | 0 | | | | | | |
| | | 4 | | | | | <= four-delay partial result |
| | | 3 | | | | | <= three-delay carry-in, treated as partial result |

Figure 2A:
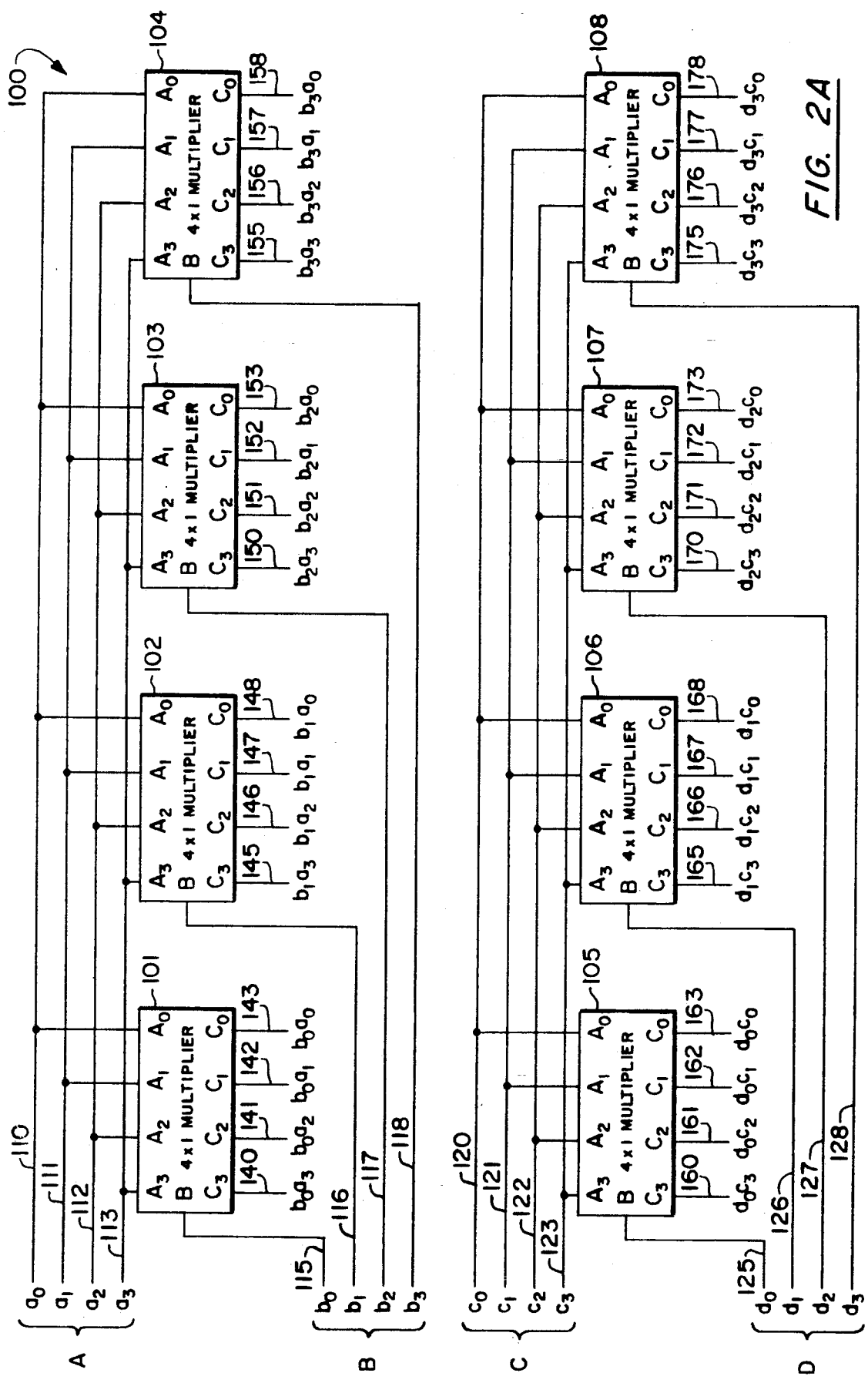
FIG. 2A is a diagram of an array of multipliers providing partial products for the equation $E = A \times B + C \times D$ which are input to the Weighted-Delay Column Adder of the present invention.
Figure 2B:
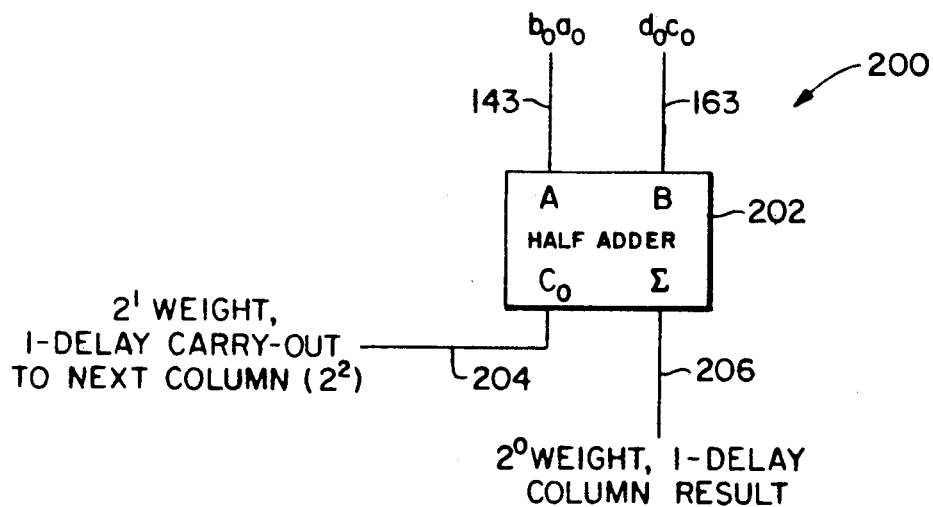
FIG. 2B is a diagram of a "column" of the Weighted-Delay Column Adder of the present invention.
Figure 2C:
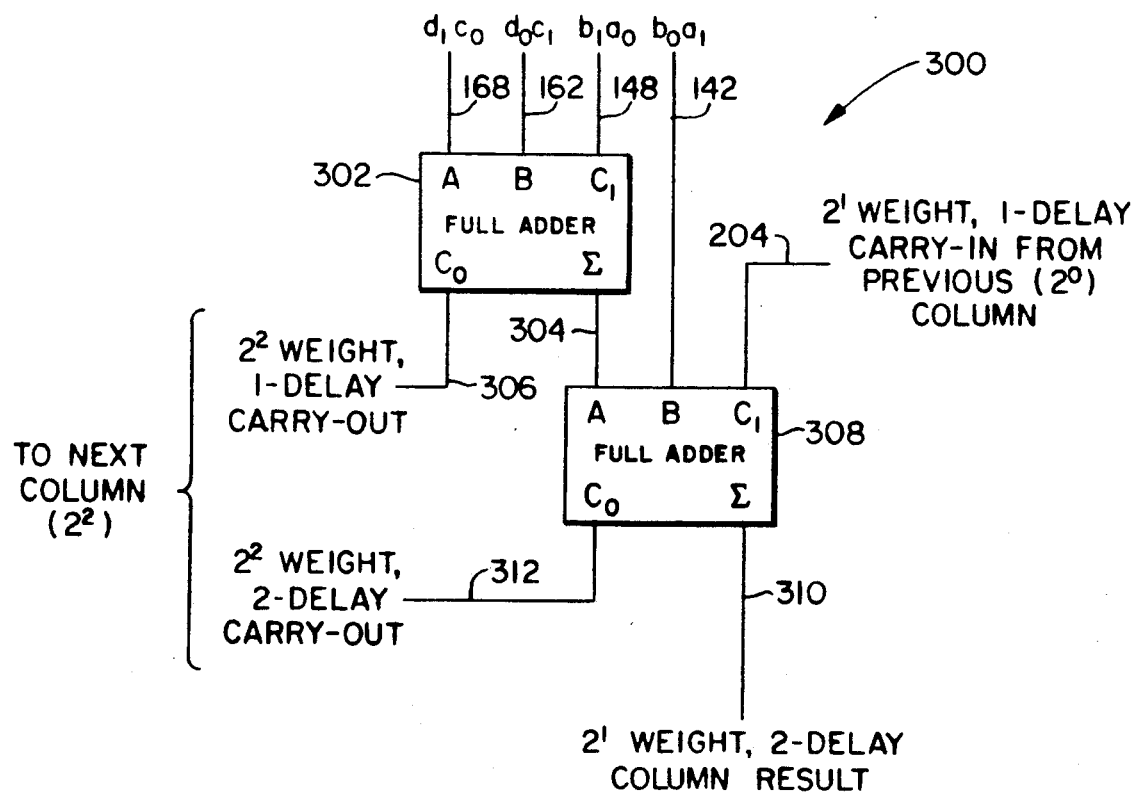
FIG. 2C is a diagram of another column of the Weighted-Delay Column Adder of the present invention.
Figure 2D:
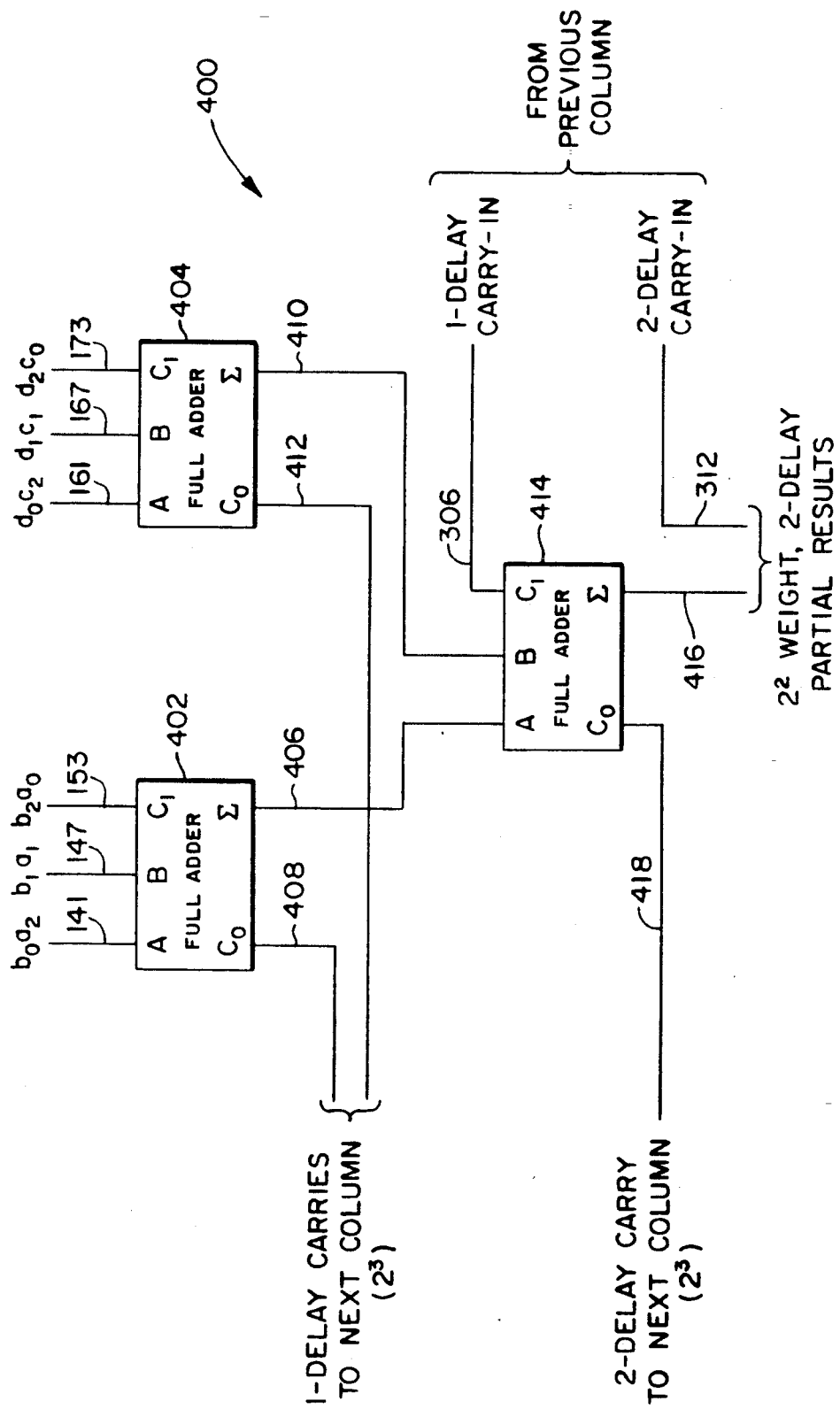
FIG. 2D is a diagram of another column of the Weighted-Delay Column Adder of the present invention.
Figure 2E:
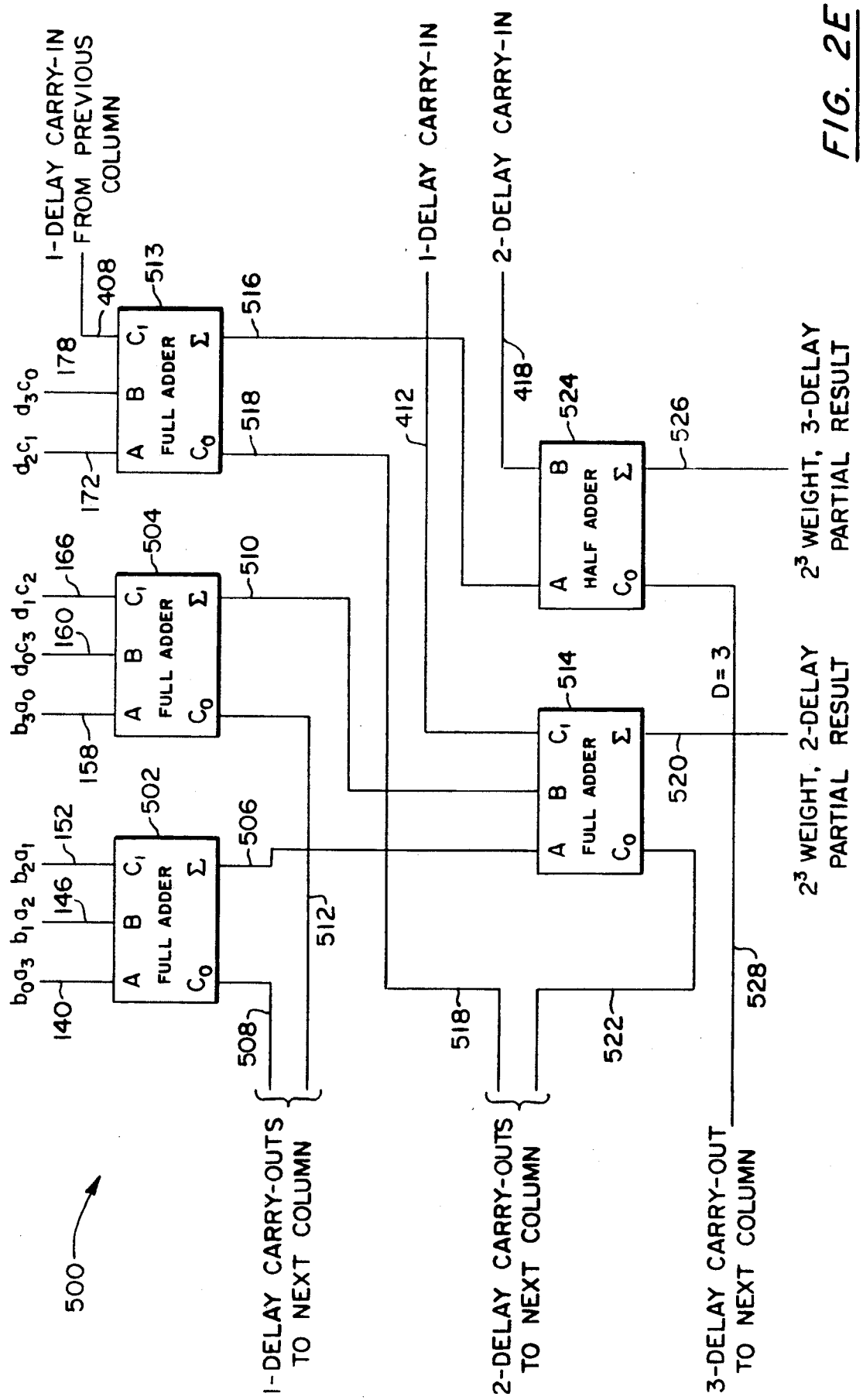
FIG. 2E is a diagram of another column of the Weighted-Delay Column Adder of the present invention.
Figure 2F:
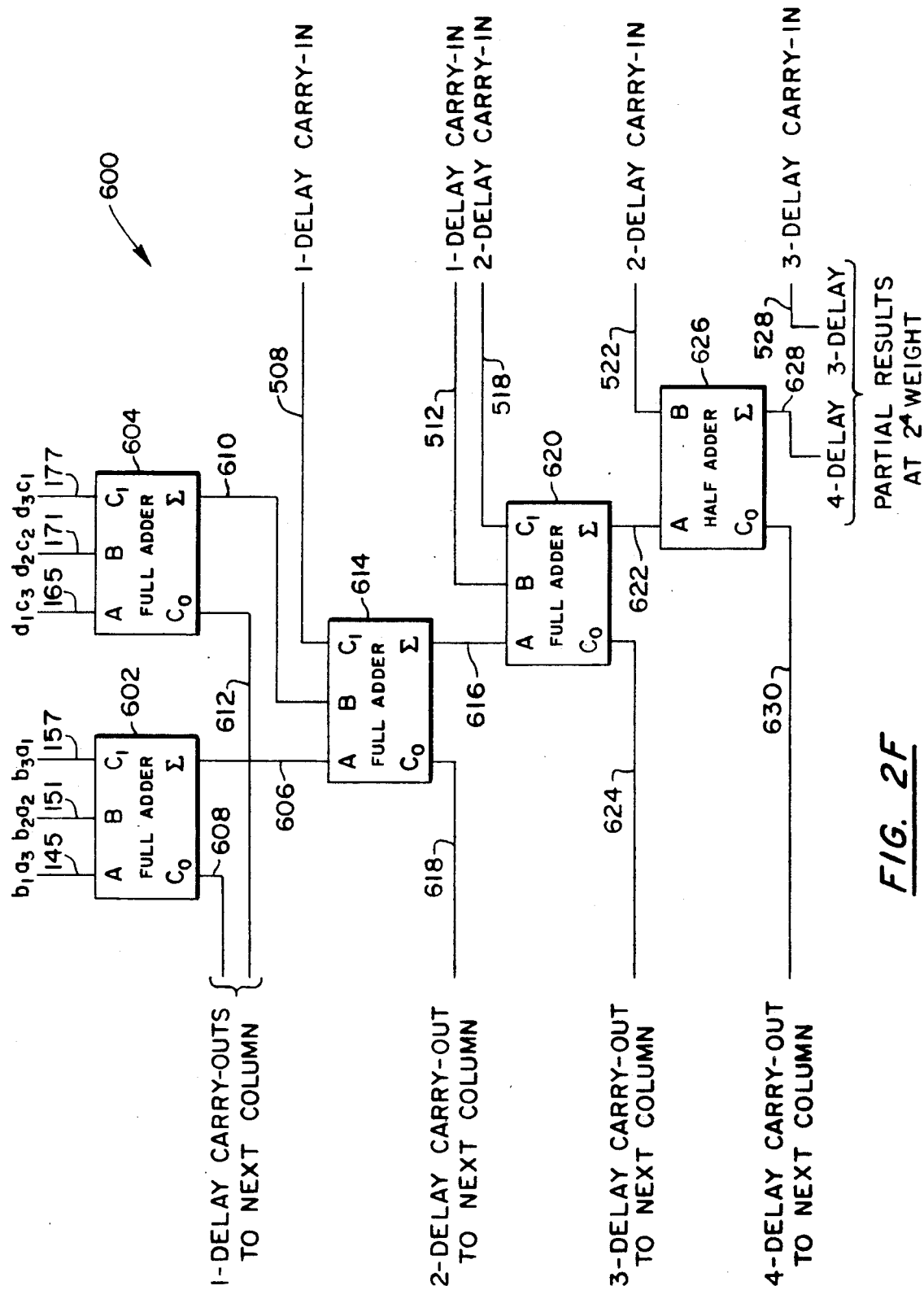
FIG. 2F is a diagram of another column of the Weighted-Delay Column Adder of the present invention.
Figure 2G:
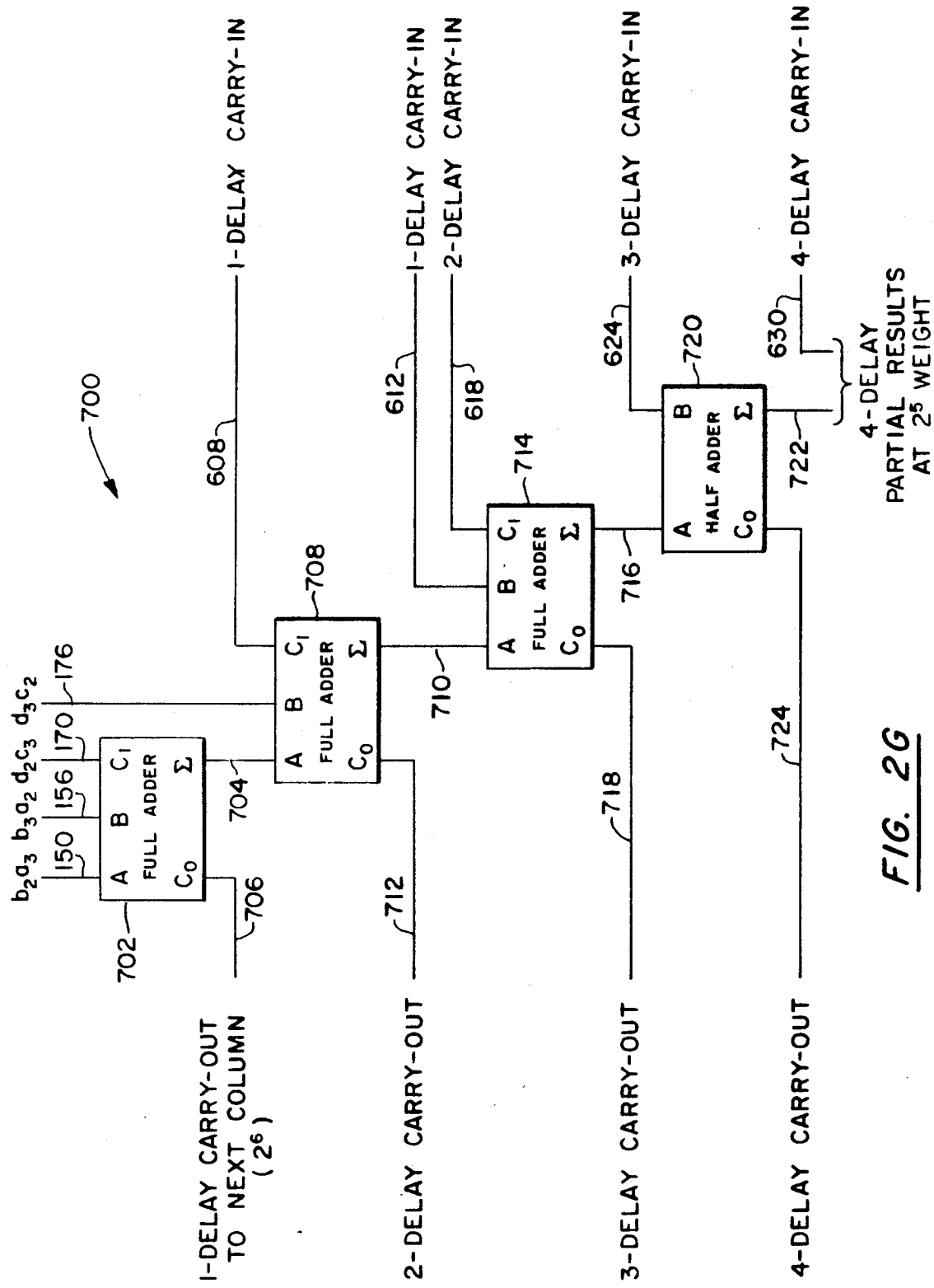
FIG. 2G is a diagram of another column of the Weighted-Delay Column Adder of the present invention.
Figure 2H:
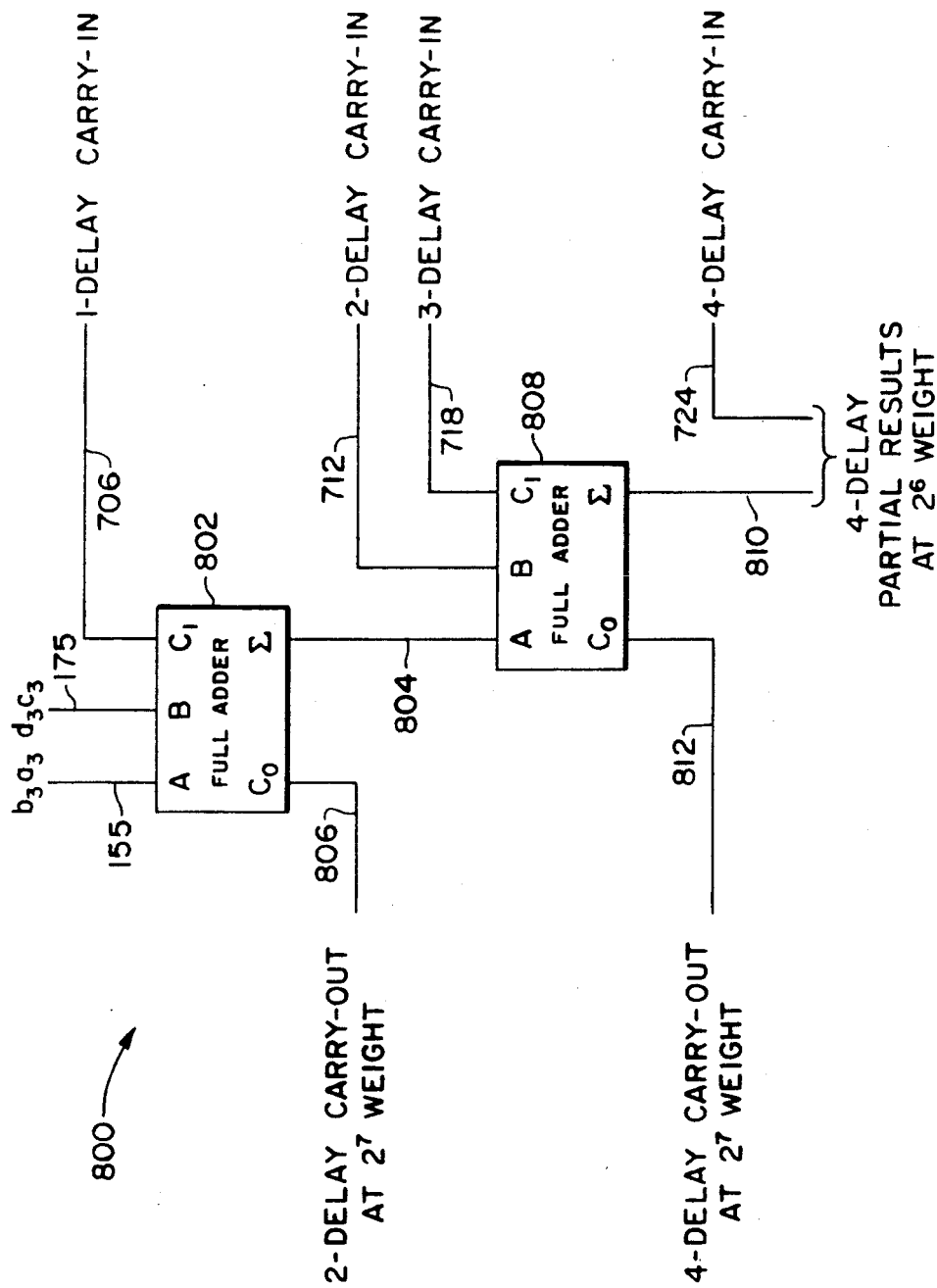
FIG. 2H is a diagram of another column of the Weighted-Delay Column Adder of the present invention.
Figure 2I:
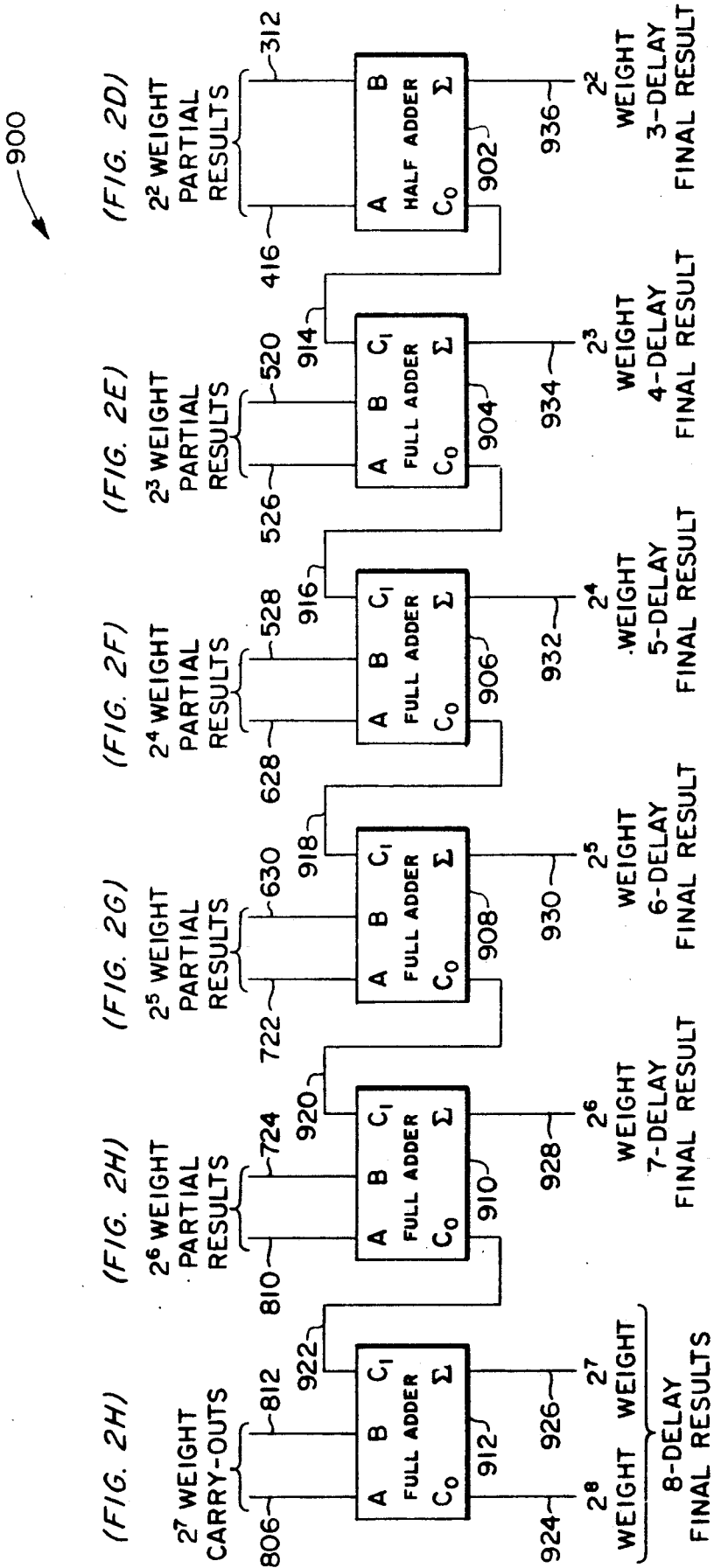
FIG. 2I is a diagram of a ripple-carry adder which takes the outputs of the various columns (FIGS. 2B–2H) of the Weighted-Delay Column Adder of the present invention and arrives at a final result.

Again, it will be seen that the four-unit delay carry-out from the $2^4$ column will be placed at the end of the $2^5$ column to be combined, as one of two partial results with the partial result thereof, leading to a final result when added by the final stage adder (FIG. 2I). Further, it is evident that the three and four unit delays of the partial results is a remarkable achievement for a column adding eleven bits.

Next, the $2^5$ column is processed. Three of the four zero-delay input bits (shown above) are added together in a full adder, producing a one-delay carry-out (shown below) which is placed in the $2^6$ column and a one-delay intermediate sum. The remaining zero-delay input bit, the one-delay intermediate sum and one of the two one-delay carry-ins from the $2^4$ column are summed in another full adder, producing a two-delay carry-out (shown below) which is placed in the $2^6$ column and a two-delay intermediate sum. The two-delay intermediate sum, the remaining one-delay carry-in from the $2^4$ column, and the two-delay carry-in from the $2^4$ column are summed in another full adder, producing a three-delay carry-out (shown below) which is placed in the $2^6$ column and a three-delay intermediate sum. The three-delay intermediate sum and the three-delay carry-in from the $2^4$ column are added in a half-adder, producing a four-delay carry-out (shown below) which is placed in the $2^6$ column and a four-delay partial result. The four-delay carry-in from the previous column and the four-delay partial result of the present column are taken together as partial results of the $2^5$ column which will be combined in a final ripple carry adder stage.

| $2^6$ | $2^5$ | $2^4$ | $2^3$ | $2^2$ | $2^1$ | $2^0$ | |
|---|---|---|---|---|---|---|---|
| 4 | | | | | | | <= four-unit delay carry from $2^5$ column |
| 3 | | | | | | | <= three-unit delay carry from $2^5$ column |
| 2 | | | | | | | <= two-unit delay carry from $2^5$ column |
| 1 | | | | | | | <= one-unit delay carry from $2^5$ column |
| 0 | | | | | | | |
| 0 | | | | | | | |
| | 4 | | | | | | <= four-delay partial result |
| | 4 | | | | | | <= four-delay carry-in, treated as partial result |

Finally, the $2^6$ column is processed. The two zero-delay input bits (shown above) and the one-delay carry-in from the $2^5$ column are summed in a full adder, producing a two-unit delay carry-out (shown below) for which a new, $2^7$-weight column is created, and a two-delay intermediate sum. The two-delay intermediate sum, and the two and three-delay carry-ins from the $2^5$ column are summed, producing a four-delay carry-out (shown below) which is placed in the new $2^7$-weight column, and a four-delay partial result. The four-delay partial result and the four-delay carry-in from the $2^5$ column are taken together as partial results for the $2^6$ column, and will be combined in a final ripple carry adder stage.

| $2^7$ | $2^6$ | $2^5$ | $2^4$ | $2^3$ | $2^2$ | $2^1$ | $2^0$ | |
|---|---|---|---|---|---|---|---|---|
| 4 | | | | | | | | <= four-delay carry-out |
| 2 | | | | | | | | <= two-delay carry-out |
| | 4 | | | | | | | <= four-delay partial result |
| | 4 | | | | | | | <= four-delay carry-in |

Typically, this process of column decomposition and reduction via an adder chain would be repeated until the most significant column (which may be composed of nothing but carries-in from the previous, next less significant column) has fewer than three inputs (including carry-ins, if any). In the example given above, the $2^7$ column has only two inputs, so the process is complete. The fully processed data consists of 8 columns of one or two single-bit, closely delay-matched partial results as follows:

| $2^7$ | $2^6$ | $2^5$ | $2^4$ | $2^3$ | $2^2$ | $2^1$ | $2^0$ |
|---|---|---|---|---|---|---|---|
| 4 | 4 | 4 | 4 | 3 | 2 | 2 | 1 |
| 2 | 4 | 4 | 3 | 2 | 2 | | |

At this point, a final result may be obtained with a ripple-carry (fast) adder. Starting with the least significant column which has two partial results, the fast adder is designed. In this case, both the $2^0$ and the $2^1$ columns have only one result, so these bits may bypass the fast adder and be treated as a final result as the $2^0$ and $2^1$ weight component bits, respectively, of the final sum of the binary numbers being added by the weighted-delay column adder. This leaves six columns which must be summed. For each column with two components, except for the least significant, a full adder is used, where two inputs are used for the two (partial result) components and one input is used for the carry-out from the addition of the two partial results of the next less significant column. All of the one component columns will use a half adder, where one input is for the column result and the other input is for the carry-out from the previous stage. Since the least significant column has two components, but there is no carry from the previous column, a half adder is used where both inputs are for the column component results.

Recognizing and reacting to the fact that one or more of the columns may produce only one result, and designing the final fast-adder stage with this fact in mind, represents an optimal construction. However, it is within the scope of this invention that all of the columns of the weighted-delay column adder may be configured to have two (partial result) outputs, and the final fast-adder stage can be designed accordingly, with full adders in all of the columns except for the least significant (e.g. $2^0$ column). In fact, with this criteria in mind, the configuration of the weighted-delay column adder itself becomes less critical, since the final fast-adder stage would be more "generic", having been designed to deal with two partial results from each column (adder chain).

HARDWARE EMBODIMENT

With attention to FIGS. 2A through 2I, the hardware solution for the above-described example of A times B plus C times D is shown, column-by-column, where A, B, C, and D are all 4-bit unsigned binary numbers. It should be understood that the example used herein is for illustrative purposes only, and that the scope of the invention extends beyond the particular embodiment disclosed herein.

FIG. 2A is a diagram of the multiplication array (32 "AND" gates organized in groups of four to form eight 4-by-1 multipliers 101, 102, 103, 104, 105, 106, 107 and 108). FIGS. 2B through 2I depict the Weighted-Delay Column Adder of the current invention, where FIGS. 2B through 2H depict the weighted column adder chains and FIG. 2I depicts the final stage ripple-carry adder.

FIG. 2A shows the hardware 100 comprising the array of one-by-four bit multipliers used to arrive at the partial products which will be input to the Weighted-Delay Column adder. Each of the multipliers is constructed from four "AND" gates in the manner of the 1-bit by 8-bit multiplier shown in FIG. 1.

In FIG. 2A, the component bits of A: 110, 111, 112, and 113 ($a_0$, $a_1$, $a_2$, and $a_3$, respectively) are each multiplied by each of the component bits of B: 115, 116, 117, and 118 ($b_0$, $b_1$, $b_2$, and $b_3$, respectively) to arrive at 16 partial products ($b_0a_3$, $b_0a_2$...): 140, 141, 142, 143, 145, 146, 147, 148, 150, 151, 152, 153, 155, 156, 157, and 158. In like manner, the component bits of C: 120, 121, 122, and 123 are each multiplied by each of the component bits of D: 125, 126, 127, and 128 to arrive at 16 additional intermediate products: 160, 161, 162, 163, 165, 166, 167, 168, 170, 171, 172, 173, 175, 176, 177, and 178. The intermediate product bits will be added in a Weighted-Delay Column Adder, as described with respect to FIGS. 2B through 2H, the results of which addition will be combined in a final adder stage to form the completed result, as described with respect to FIG. 2I.

FIG. 2B shows the adder chain 200 for the least significant column ($2^0$), in this example, for adding the partial products $b_0a_0$ and $d_0c_0$. The partial product 143 ($b_0a_o$) is applied to the "A" input of a half-adder 202, and the partial product 163 ($d_0c_0$) is applied to the "B" input of the adder 202. The one-bit result (Sigma) is output on a line 206, and has a weight (significance) of $2^0$ and a delay (D) of one-unit. The carry-out ($C_o$) appears on a line 204, and has binary weight (significance) of $2^1$ and a delay of one-unit. The carry out on the line 204 will be applied in the addition of the next higher significant column ($2^1$), as described with respect to FIG. 2C.

One skilled in the art to which the present invention most nearly pertains will recognize that the delay values of one-unit are approximations used for illustrative purposes only, and that the actual delay between the inputs and outputs of half- or full-adders is dependent upon state conditions and device-specific speeds. Hence, the delays discussed herein should be considered "maximum" delays through the various adders of the adder chains. The designer will be able to take these factors into account in the implementation of this invention, based on the description contained herein.

FIG. 2C shows the adder chain 300 for adding the partial products in the next higher (more) significant column ($2^1$), in other words, the addition of $d_1c_o$, $d_oc_1$, $b_1a_o$ and $b_oa_1$, and the carry-out 204 from the previous column (described with respect to FIG. 2A). The partial product 168 ($d_1c_o$) is applied to the "A" input of a full adder 302, the partial product 162 ($d_oc_1$) is applied to the "B" input of the adder 302, and the partial product 148 ($b_1a_0$) is applied to the "$C_i$" input of the adder 302. The 1-bit partial result is output on a line 304, and has a weight of $2^1$ and a delay value (D) of one-unit, and the carry-out ($C_o$) appears on a line 306 with a binary weight of $2^2$ and a delay of one-unit. The carry-out on the line 306 will be applied in the addition of the next higher significant column ($2^2$), as described hereinafter.

The intermediate sum (result) on the line 304 from the adder 302 is applied to the "A" input of a full adder 308, the partial product on line 142 ($b_oa_1$) is applied to the "B" input of the full adder 308 and the carry out on the line 204 from the addition of the previous column is applied to the "C" input of the full adder 308. The 1-bit result is output on a line 310, has a binary weight of $2^1$ and has a "maximum" delay of two units, since bits propagating through the adder chain may have been operated on by two adders 302 and 308 (or 202 and 308 in the case of the carry-out 204), each interposing a propagation delay of one-unit. Similarly, the 1-bit carry out (C) is provided on a line 312, and has a binary weight of $2^2$ and a maximum delay of two-units. The carry-out on the line 312 will be applied in the addition of the next higher significant column ($2^2$), as described hereinafter.

It should be noted, throughout the Figures, that the partial products can be applied to the inputs (A, B, C) of the adders in any order. It should also be noted that the partial products within one column may be interchanged in any order for the purpose of addition. In similar fashion, within one column, carry-ins from the previous column having the same delay value may be interchanged in any order.

FIG. 2D shows the adder chain 400 for the next higher significant column ($2^2$). Partial products $b_0a_2$, $b_1a_1$, and $b_2a_0$, on lines 141, 147, 153, respectively are connected to inputs "A", "B", and "C", of adder 402, respectively, producing a one-delay intermediate sum 406 and a one-delay carry-out 408. Partial products $d_0c_2$, $d_1c_1$, and $d_2c_0$ on lines 161, 167, and 173, respectively, are connected to inputs "A", "B", and "C", of adder 404, respectively, producing a one-delay intermediate sum 410 and a one-delay carry-out 412. The two intermediate sums 406 and 410 and the one-delay carry 306 from the previous stage (FIG. 2C) are connected to inputs "A", "B", and "C" of adder 414, respectively, producing a two-delay partial result 416 and a two-delay carry 418. The two-delay carry-out 312 from the previous stage is treated as a second partial result of this adder chain, and the two partial results will be summed at $2^2$ weight in a final fast adder stage (FIG. 2I). The two one-delay carries 408 and 412, and the two-delay carry 418 will be passed on to the next significant column ($2^3$), as described with respect to FIG. 2E.

FIG. 2D is particularly illustrative of the method of bringing in the carry-out (312) from the previous column into the present column at the end thereof to be combined with a similarly delay-weighted column result (416) thereof.

FIG. 2E shows the adder chain 500 for the next higher significant column ($2^3$). Partial products $b_0a_3$, $b_1a_2$, and $b_2a_1$, on lines 140, 146, and 152, respectively are connected to the "A", "B", and "C" inputs, respectively of full adder 502, producing a one-delay intermediate sum on a line 506 and a one-delay carry-out on a line 508. Partial products $b_3a_0$, $d_0c_3$, and $d_1c_2$, on lines 158, 160, and 166, respectively, are connected to the "A", "B", and "C" inputs of a full adder 504, producing a one-delay intermediate sum 510 and a one-delay carry-out 512. The two one-delay intermediate sums 506 and 510, and the one-delay carry-in 412 from the previous column are connected to the "A", "B", and "C" inputs of a full adder 514, producing a two-delay, $2^3$-weight partial result on a line 520 and a two-delay carry-out on a line 522. The partial product $d_2c_1$ on line 172, the partial product $d_3c_0$ on line 178 and the one-delay carry-in on the line 408 are connected to the "A", "B", and "C" inputs of a full adder 513, respectively, producing a two-delay intermediate sum 516 and a two-delay carry-out 518. The other one-delay carry-out 412 from the previous column on the line 418 and the intermediate sum on the line 516 are connected to inputs "A" and "B" of a half-adder 524, producing a partial column result 526 with a binary weight of $2^3$ and a three-delay carry-out 528. All of the carries out of this column have a binary weight of $2^4$ and are carried over to the next most significant column, as described with respect to FIG. 2F.

FIG. 2E is particularly illustrative of the method of obtaining two partial results (520, 526) from the present adder chain. In this case, all of the carry-outs from the previous column were brought into the adder chain for addition with input bits and intermediate sums arrived at therein at points where their delays most nearly matched the delays of the input bits and intermediate sums.

FIG. 2F shows the adder chain 600 for the next more (higher) significant column ($2^4$). Partial products $b_1a_3$, $b_2a_2$, and $b_3a_1$, on lines 145, 151, and 157, respectively, are connected to inputs "A", "B", and "C" of full adder 602, respectively, producing a one-delay intermediate sum 606 and a one-delay carry-out 608. Partial products $d_1c_3$, $d_2c_2$, and $d_3c_1$, on lines 165, 171, and 177, respectively, are connected to inputs "A", "B", and "C" of full adder 604, respectively, producing a one-delay intermediate sum 610 and a one-delay carry-out 612. The two intermediate sums 606 and 610 and the one-delay carry from the previous column on line 508 are connected to inputs "A", "B", and "C", respectively, of full adder 614, producing a two-delay intermediate sum 616 and a two-delay carry-out 616. The intermediate sum 616, the one-delay carry 512 and the two-delay carry 518 are connected to inputs "A", "B", and "C", respectively, of full adder 620, producing a three-delay intermediate sum 622 and a three-delay carry-out 624. The intermediate sum 622 and the remaining two-delay carry 522 from the previous ($2^3$) column are connected to the "A" and "B" inputs of a half adder 626, producing a four-unit delay partial result 628 and a four-unit delay carry-out 630. The three-delay carry 528 from the previous column and the partial result 628 are taken as two partial results of this column, and are provided to a final ripple-carry adder stage, as described with respect to FIG. 2I. All of the carries out of this column: 608, 612, 618, 624, and 630; are passed on the next more significant column ($2^5$), as described with respect to FIG. 2G.

Again, in FIG. 2F it is well illustrated that the longest (highest delay-weighted) carry-out (528) from the previous column is conveniently brought in to the present column at the end thereof, and treated as one of two partial results of that column.

FIG. 2G shows the adder chain 700 for the next more significant column ($2^5$). Partial products $b_2a_3$, $b_3a_2$, and $d_2c_3$ on lines 150, 156, and 170, respectively, are applied to inputs "A", "B", and "C" of full adder 702, producing an intermediate sum 704 and a carry-out 706, both having a one-unit propagation delay through the adder 702. The intermediate sum 704, partial product $d_3c_2$, and the one-delay carry-in 608 from the previous column, are applied to inputs "A", "B", and "C" of a full adder 708, respectively, producing a two-delay intermediate sum 710 and a two-delay carry-out 712. The intermediate sum 710, the other one-delay carry-in 612 and the two-delay carry-in 618 are applied to inputs "A", "B", and "C", respectively, of a full adder 714, producing a three-delay intermediate sum 716 and a three-delay carry-out 718. The "maximum" delay through the adder 714 is considered to be three-units, since the carry-in 618 and the intermediate sum 710 each may have maximum delays of two-units. The intermediate sum 716 and the three-delay carry-in 624 from the previous ($2^4$) column are applied to inputs "A" and "B", respectively, of a half-adder 720, producing a four-delay partial result 722 and a four-delay carry-out 724. The partial result 722 and the four-delay carry in 630 from the previous stage are taken together as partial results with $2^5$ weight and are applied to a final ripple-carry adder stage, as described with respect to FIG. 2I. All of the carries out of this stage: 706, 712, 718, and 724; are passed on the next more significant column ($2^6$), as described with respect to FIG. 2H.

FIG. 2H shows the adder chain 800 for the next more significant column ($2^6$) of the weighted-delay column adder. Partial products $b_3a_3$ and $d_3c_3$ on lines 155 and 175, respectively, and the one-delay carry-in 706 from the previous ($2^5$) column are applied to inputs "A", "B", and "C", respectively, of a full adder 802, producing a two-delay intermediate sum 804 and a two-delay carry-out 806. The intermediate sum 804 and the two- and three-unit delay carry-ins from the previous column on lines 712 and 718, respectively, are applied to inputs "A", "B", and "C", respectively, of a full adder 808, producing the four-delay partial result 810 and a four-delay carry-out 812. The four-delay carry-in 724 from the previous column and the partial result 810 are taken together as partial results having $2^6$-weight and are applied to a final ripple-carry adder stage, as described with respect to FIG. 2I.

The two carry-outs 806, 812 out of this column (adder chain 800) are passed on to the next column at $2^7$-weight, which column, having only these two one-bit binary inputs, is further passed on at $2^7$-weight directly to the final ripple-carry adder stage, as describe with respect to FIG. 2I.

FIG. 2I shows an embodiment 900 for the final ripple-carry adder stage. The ripple-carry adder comprises a half adder 902 and five full adders 904, 906, 908, 910, and 912, arranged in order of the binary weight (significance) of partial (column) results to be added. The carry-outs from each of these adders, except for the last one (e.g. the adder 912 to which the highest binary weight is assigned) are fed directly into the carry-in of the next more significant adder. That is, carry-out 914 from half adder 902 is connected to the "C" input of the full-adder 904, the carry-out 916 from the full-adder 904 is applied to the "C" input of full the adder 906, the carry-out 918 from the full-adder 906 is applied to the "C" input of the full-adder 908, the carry-out 920 from the full-adder 908 is applied to input "C" of the full-adder 910, and the carry-out 922 from the full-adder 910 is applied to the "C" input of full-adder 912.

The $2^2$-weight, two-delay partial results from the $2^2$ column (adder chain 400) on the lines 416 and 312 are applied to the "A" and "B" inputs of the half-adder 902, which produces a final result having $2^2$-weight and three-unit delay on a line 936. The $2^3$-weight three-delay partial result on line 526 and the $2^3$-weight two-delay partial result on the line 520 are applied to the "A" and "B" inputs of a full-adder 904, and the three-delay carry 914 from the less significant $2^2$ adder 902 is applied to the "C" input thereof, thereby producing a final result having $2^3$-weight a four-unit delay on a line 934. The $2^4$-weight four-unit and three-unit delay partial results on lines 628 and 528, respectively, are applied to inputs "A" and "B", respectively, of a full adder 906 while the four-delay carry 916 from the less significant adder 904 is applied to the "C" input of the adder 916, thereby producing final $2^4$-weight five-unit delay result on a line 932. The $2^5$-weight four-delay partial results on lines 722 and 630, are applied to inputs "A" and "B", respectively, of the full-adder 908, while five-delay carry 918 from the $2^4$-weight adder 906 is applied to input "C" thereof, providing a final $2^5$-weight six-delay result on a line 930. The $2^6$-weight partial results on lines 810 and 724 are applied to the "A" and "B" inputs of the full-adder 910 while the carry 920 from the adder 908 is applied to input "C" thereof, thereby providing a final $2^6$-weight seven-delay result on a line 928. The $2^7$-weight two-unit and four-unit delay partial results on lines 806 and 812, respectively, are applied to inputs "A" and "B", respectively, of full adder 912, and the seven-delay carry 922 from the $2^6$-weight adder 910 is applied to input "C" thereof, producing final 8-delay $2^7$ and $2^8$-weight results on lines 926 and 924, respectively.

The $2^0$-weight one-delay result of the least significant adder chain 200 is read directly off of the line 206, and is valid as the $2^0$-weight bit of the final result of the addition of binary numbers being added by the weighted-delay column adder. Similarly, the $2^1$-weight two-delay result out of the $2^1$ adder chain 300 is valid as the $2^1$-weight bit of the final result.

In the examples above, the one and zero unit delays are intended for illustrative purposes only. Inputs having different delay values would have to be accounted for. For instance, input bits with greater than zero delay would need to be inserted further down the adder chain.

As shown above, by matching the delays of input bits and carry-ins to input bits, intermediate sums and partial results in each column, the final sum of the binary addition is arrived at with minimum delay while retaining a gate-efficient design.

Partial products arriving for addition at the weighted-delay column adder of the present invention can be provided from a multiplier employing a modified Booth algorithm to reduce the number of input bits.

Having thus described the invention, many modifications thereto will become apparent to those skilled in the art to which it pertains without deviating from the spirit and scope of the appended claims.

What is claimed is:

1. A method of adding two or more binary numbers, comprising:
    organizing binary numbers into columns of input bits according to the binary-weight of the individual input bits;
    arranging a plurality of adders in chains, each adder chain having a binary significance associated therewith and representing a column for adding input bits of a particular binary-weight;
    determining propagation delays for each adder output intermediate sum in each adder chain;
    applying the input bits to the adder chains for addition to adders in the chain which have the shortest possible propagation delays associated therewith; and
    applying carry-outs from an adder chain of a given binary significance "n" as carry-ins to an adder in the next more significant "n+1" adder chain which is adding intermediate sums of n+1 weight having propagation delays most nearly matching the propagation delay of the carry-ins.

2. A method as described in claim 1, wherein:
    one or more of the adder chains produces two partial results for the binary addition of the bits at that binary-weight.

3. A method as described in claim 1, further comprising:
    combining the partial results of the least significant column having two column results, including any carry-out from the previous column, and the column result(s) of the more significant columns in a fast adder stage to provide a final result of the binary addition.

4. A method as described in claim 1, wherein:
    one or more of the adder chains produces only one partial result; and further comprising:
    applying the carry-out with the longest delay from the previous column to the end of the present adder chain as a second partial result.

5. A method as described in claim 4, further comprising:
    combining the partial results of the least significant column having two column results, including any carry-out from the previous column, and the column result(s) of the more significant columns in a fast adder stage to provide a final result of the binary addition.

6. A method of adding binary numbers, comprising:
organizing the component bits of the binary numbers according to binary-weight.
adding together the component bits of a given binary weight;

7. A method of adding binary numbers comprising:
organizing the binary numbers according to bit weight;
adding bits of equal weight to provide one-bit intermediate results, a one-bit result and one-bit carry-outs, each of said intermediate results having an associated delay and each of said carry-outs having an associated delay; and
introducing the carry-outs into the addition of higher weight bits together with intermediate results of comparable delay.

8. A method of adding two or more binary numbers, comprising:
organizing said binary numbers into columns of input bits according to their weight and applying them to column arrays of adders such that the binary inputs which have the shortest associated delays are applied at the top of the column array of adders; and
applying carries from the previous columns of adders to the current column array such that the delays associated with the carries are as closely matched as possible to the delays associated with the signals in the current column at the point of their introduction, where longer delays are applied nearer to the bottom of the current column and shorter delays nearer the top of the current column.

9. A method as described in claim 8, wherein:
at least one of the columns produces more than one result; and further comprising:
providing a final parallel adder stage to combine the final results.

10. A weighted-delay column adder for adding binary numbers, comprising:
an array of adders interconnected in chains in a plurality of columns, each column corresponding to the significance of the bits of binary numbers being added and receiving those bits;
a first, least significant column of the array of adders organized such that the least significant column of bits from the binary inputs are applied to the adder chains at points having the most nearly matched delay associated therewith, and organized such that the overall delay associated with the column is minimized, with the first column producing a carry-out from each of its component adders which is passed on to the next more significant column, and also producing a final column result which is taken as the least significant bit of the total addition;
successive higher columns of the array of adders, each processing the next higher significant column of bits from the binary inputs and the carry signal(s) from the next less significant column, and organized such that the inputs bits are applied to, the chain at points having the most nearly matched delay associated therewith, and that the carry signal(s) from the next less significant column array is (are) applied to the array at points having the most nearly matched delay associated therewith or are least impacted by the delay(s) associated with the carry signal(s) from said next less significant column, with each said successive column of the array of adders producing either one or two end results, one of which is the carry signal having the longest associated delay from the next less significant column, both of which said end results are passed on to a final parallel adder stage, and each of said successive columns of the array of adders also producing carry-out signals from each of said successive column's component adders which are passed on to the next more significant column of the array of adders, until a column is reached where there are no more than a total of two inputs, including carries; and
a final column, having no more than two inputs, including carry signals, which inputs are passed directly on to a final parallel adder stage.

11. A weighted-delay column adder, according to claim 10, wherein:
all columns, including the final column have only one result bit each; and
the end result of the addition appears at the column outputs.

12. A weighted-delay column adder, according to claim 10, wherein:
one or more columns has two end results; and
all columns, starting with the least significant column having more than one result bit and continuing on to all higher significant columns, are applied to a parallel adder stage suited to two input addends, such as a ripple-carry adder, the output of which parallel adder is taken as the end result of the addition for all of its associated input columns and where the result of the less significant portion of the addition is taken directly from the less significant columns not connected to the parallel adder.

13. A weighted-delay column adder for adding binary numbers, comprising:
a plurality of adders arranged in columns, from a least significant column to a most significant, each column corresponding to the significance (weight) of the bits of binary numbers being added;
a first, least significant column receiving the least significant bits of binary numbers being added, providing a result and providing a carry-out to the next more significant column;
subsequent, next more significant columns receiving the corresponding next higher significant bits of the binary numbers being added and the carry-outs from less significant columns, providing a result and providing a carry-out to the next more significant column; and
a final, most significant column receiving the most significant bits of the binary numbers being added and the carry-outs from the next less significant column and providing two results;
wherein delays are associated with positions along the columns;
wherein the carry-outs have delays; and
the carry-outs from the columns are provided to the more significant columns at positions closely matching the carry-out delays.

* * * * *